(12) United States Patent
Taniguchi et al.

(10) Patent No.: US 7,698,319 B2
(45) Date of Patent: Apr. 13, 2010

(54) DATABASE SYSTEM MANAGEMENT METHOD, DATABASE SYSTEM, DATABASE DEVICE, AND BACKUP PROGRAM

(75) Inventors: Kazuhiro Taniguchi, Kawasaki (JP); Teruyuki Goto, Kawasaki (JP); Toshihide Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 11/647,049

(22) Filed: Dec. 27, 2006

(65) Prior Publication Data

US 2007/0233753 A1 Oct. 4, 2007

(30) Foreign Application Priority Data

Mar. 31, 2006 (JP) ............................. 2006-098594

(51) Int. Cl.
*G06F 7/00* (2006.01)
(52) U.S. Cl. ........................................ 707/674; 707/682
(58) Field of Classification Search ................. 707/202, 707/204, 200, 10
See application file for complete search history.

(56) References Cited

U.S. PATENT DOCUMENTS

| | | | | |
|---|---|---|---|---|
| 5,907,848 A | * | 5/1999 | Zaiken et al. ............... | 707/202 |
| 6,934,877 B2 | * | 8/2005 | Tamatsu ........................ | 714/5 |
| 6,983,277 B2 | * | 1/2006 | Yamaguchi et al. ............ | 707/8 |
| 2003/0061537 A1 | * | 3/2003 | Cha et al. ...................... | 714/16 |
| 2003/0191782 A1 | * | 10/2003 | Buxton et al. ............... | 707/202 |
| 2004/0111417 A1 | * | 6/2004 | Goto et al. ..................... | 707/10 |
| 2006/0218206 A1 | * | 9/2006 | Bourbonnais et al. ....... | 707/202 |

FOREIGN PATENT DOCUMENTS

JP 2003-015926 1/2003

* cited by examiner

*Primary Examiner*—Don Wong
*Assistant Examiner*—Angela M Lie
(74) *Attorney, Agent, or Firm*—Greer, Burns & Crain, Ltd.

(57) ABSTRACT

A method manages a database system that includes a first database device whose memory content in a storage area is changed based on a command designated through a network from any business terminal device, and a second database device for storing the same memory content as the first database device as a backup. The method makes the first database device execute: creating and storing a logical log that correlates a command content with a memory content in the storage area every time the process is executed; creating a physical log that correlates a position information about the portion that is changed by the process, the memory content after changing by the process, and a class of the process every time the process is executed; and storing command specifying information that specifies the command corresponding to the physical log with the corresponding physical log every time each physical log is created.

5 Claims, 11 Drawing Sheets

| Class | Transaction ID | Resource code | Page number | Position | Updated data | Primary key |
|---|---|---|---|---|---|---|
| INSERT | 0001 | 0099 | 2 | 100 | DB record: Sales slip 1001, TV-01, 100 sets | — |
| UPDATE | 0001 | 0099 | 2 | 100 | Updated part in DB record: Offset 20, Length 4, Value 300 sets | Sales slip 1001 |
| DELETE | 0001 | 0099 | 3 | 80 | — | Sales slip 1002 |
| COMMIT | 0001 | — | — | — | — | — | samples of recovery log

Fig. 6

Differential log I/O buffer copy process

Fig. 7

Differential log file writing process

DATABASE SYSTEM MANAGEMENT METHOD, DATABASE SYSTEM, DATABASE DEVICE, AND BACKUP PROGRAM

BACKGROUND OF THE INVENTION

The present invention relates to a method for managing a database system that consists of a plurality of database devices. Further, it relates to a database system that realizes such a management method, to a database device that constitutes such a database system, and to a backup program that makes a computer operate as such a database device.

Database devices are widely used to save a large amount of job data generated by daily operations so that users can freely search the job data. A replica of a database device is provided to avoid information loss due to a natural disaster, a power failure, or a system failure. The replica is located at a auxiliary center that is apart from a primary center where the database device is located, and saves backup of the job data. Further, if the replica can operate as a secondary machine when the database device at the primary center is out of operation, a job can continue with the database device at the auxiliary center until restoration of the database device at the primary center.

In the above-described database system, there are two ways to update job data in the replica on a daily basis. One is a full backup by which all the job data in the original database device is copied to the replica. The other is a differential backup by which differential information about the update in the original database device is passed to the replica through the network. The differential backup is generally used rather than the full backup. There are two methods to generate the differential information passed to the replica. One method uses a physical log that is recorded by the original database device for recovery of itself. The other method creates and uses a logical log that is a record of operation contents about update.

The former physical log is information that mainly defines correspondence between position information that shows physical position in a storage area of the database device and the updated data at the position. On the other hand, the latter logical log is information that mainly defines correspondence between an SQL (Structured Query Language) statement image and the updated data. Since the former physical log is the position information of the physical position in the storage area, the replica must be constructed as a database device having the completely same configuration as the original device in order to update the job data in the replica using the physical log. However, since it is difficult to construct such a database device, the latter method that uses the logical log as the differential information is adopted in general.

Figure 8:
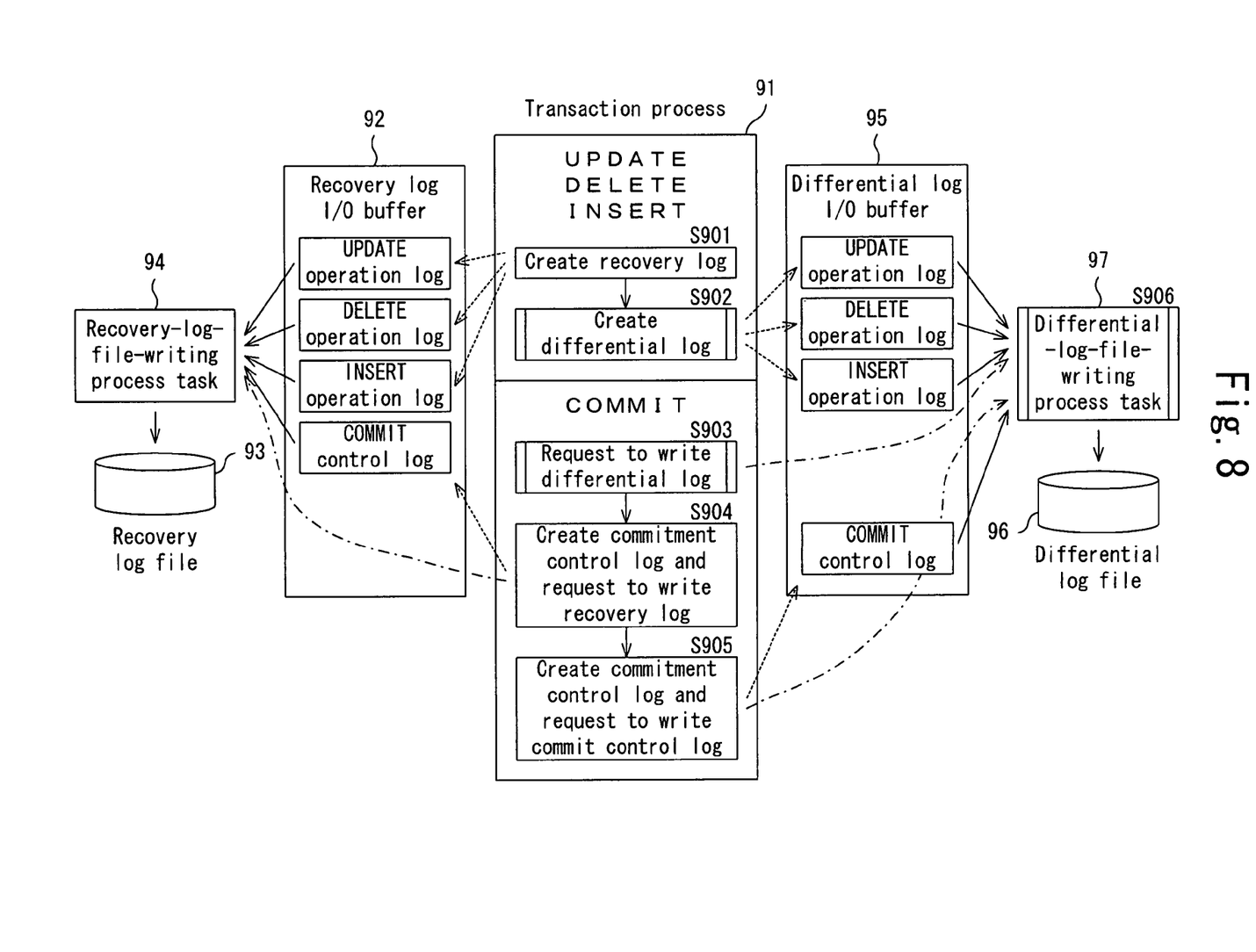
FIG. 8 is a functional configuration diagram about a function to create and save both a recovery log and a differential log in a conventional original database device.

FIG. 8 is a functional constitution diagram about the function to create and save both a recovery log (a physical log) and a differential log (a logical log) in an original database device of a prior art.

As shown in FIG. 8, the database device includes a function 91 for executing transaction, a recovery log I/O buffer 92 for temporarily storing a recovery log, a recovery log file 93 for saving the recovery log, a function 94 for writing a recovery log, which is read from the recovery log I/O buffer 92, into the recovery log file 93, a differential log I/O buffer 95 for temporarily storing the differential log, a differential log file 96 for saving the differential log, and a function 97 for writing a recovery log, which is read from the differential log I/O buffer 95, into the differential log file 96.

Figure 9:
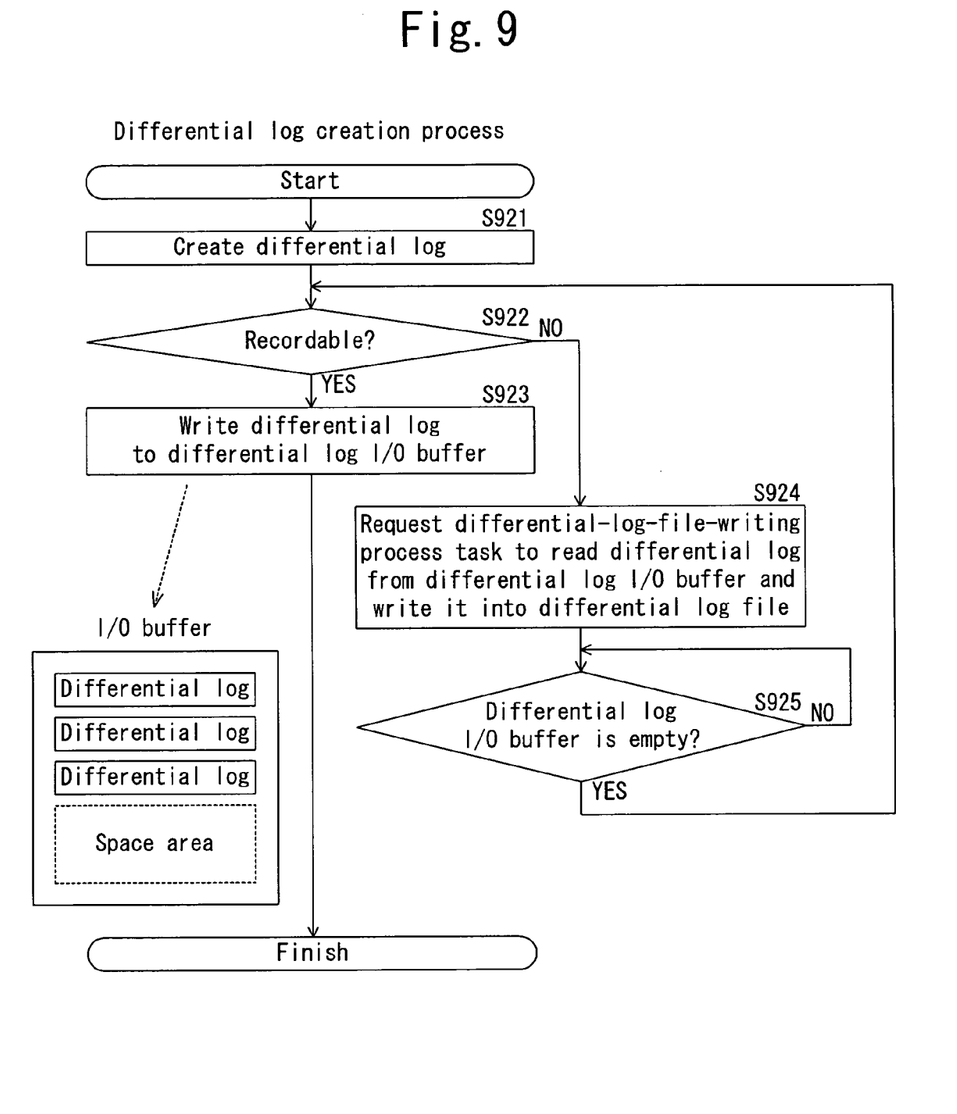
FIG. 9 is a flowchart showing the flow of a process to write a differential log into a differential log I/O buffer.

When an application (not shown) executes processes of UPDATE, DELETE, and INSERT statements in SQL statements that constitute the transaction, the function 91 for executing transaction creates a recovery log (a physical log) and writes the recovery log to the recovery log I/O buffer 92 (step S901). Subsequently, the function 91 creates a differential log (a logical log) and writes the differential log to the differential log I/O buffer 95 (step S902). FIG. 9 is a flowchart that concretely shows the process (step S902) to write a differential log to the differential log I/O buffer 95. As shown in FIG. 9, this function 91 creates a differential log (step S921) and writes the differential log to the differential log I/O buffer 95 (step S923), if the differential log I/O buffer 95 is recordable (step S922; YES). On the other hand, if the differential log I/O buffer 95 is not recordable (step S922; NO), the function 91 requests a differential-log-file-writing process task 97 to write the differential log, which is read from the differential log I/O buffer 95, into the differential log file 96 (step S924). That is, the function 91 moves the differential log from the differential log I/O buffer 95 to the differential log file 96. After the differential log I/O buffer 95 becomes empty (step S925; YES), the function 91 writes the differential log to the differential log I/O buffer 95 (step S922; YES, S923).

Figure 10:
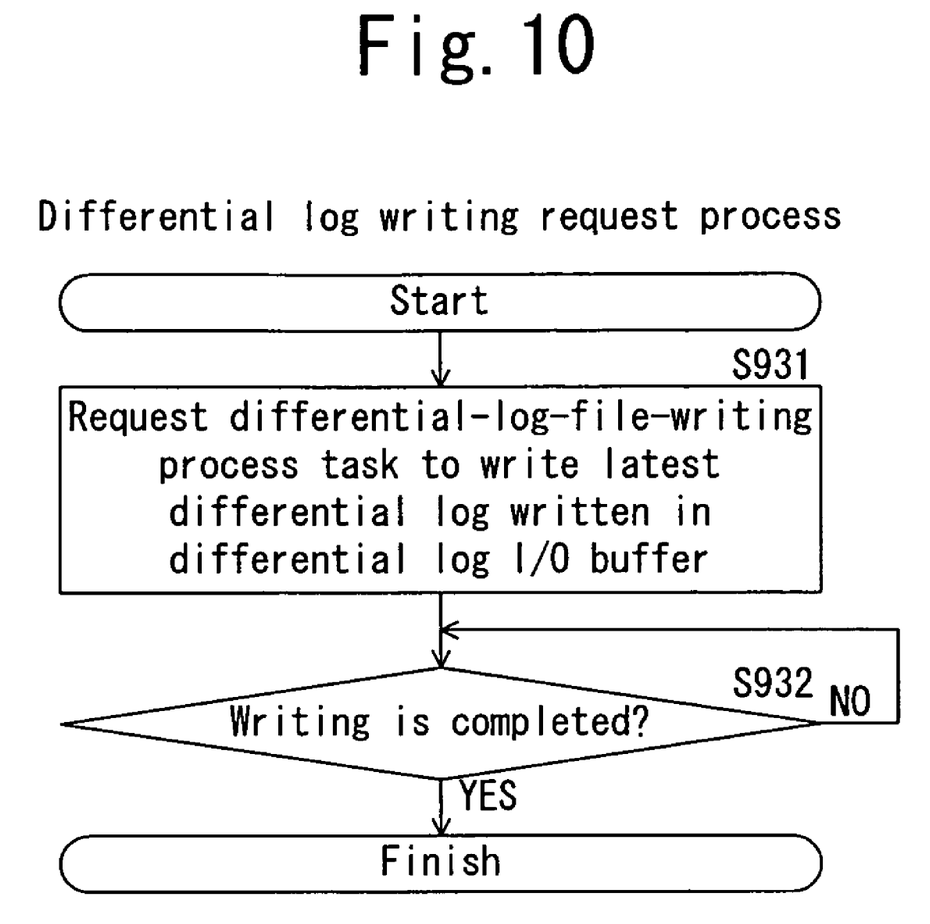
FIG. 10 is a flowchart showing the flow of a writing request process to a differential-log-file-writing process task.

When an application (not shown) executes a process of a commitment (COMMIT) statement in SQL statements, the function 91 for executing transaction requests the differential-log-file-writing process task 97 to write the differential log, which is read from the differential log I/O buffer 95, into the differential log file 96 (step S903). FIG. 10 is a flowchart that concretely shows the flow of a writing request process (step S903) that is issued to the differential-log-file-writing process task 97. As shown in FIG. 10, the function 91 requests the differential-log-file-writing process task 97 to write the latest differential log written in the differential log I/O buffer 95 to the differential log file 96 (step S931). Receiving a completion of the writing process (step S932; YES), the function 91 proceeds with the process to the next step.

Subsequently, the function 91 creates a recovery log about the commitment control and writes it to the recovery log I/O buffer 92. Then, the function 91 requests the recovery-log-file-writing process task 94 to write all the recovery logs, which are read from the recovery log I/O buffer 92, into the recovery log file 93 (step S904). Next, the function 91 creates a differential log about the commitment control and writes it to the differential log I/O buffer 95. Then, the function 91 requests the differential-log-file-writing process task 97 to write the differential log about the current commitment control, which is read from the differential log I/O buffer 95, into the differential log file 96 (step S905).

Figure 11:
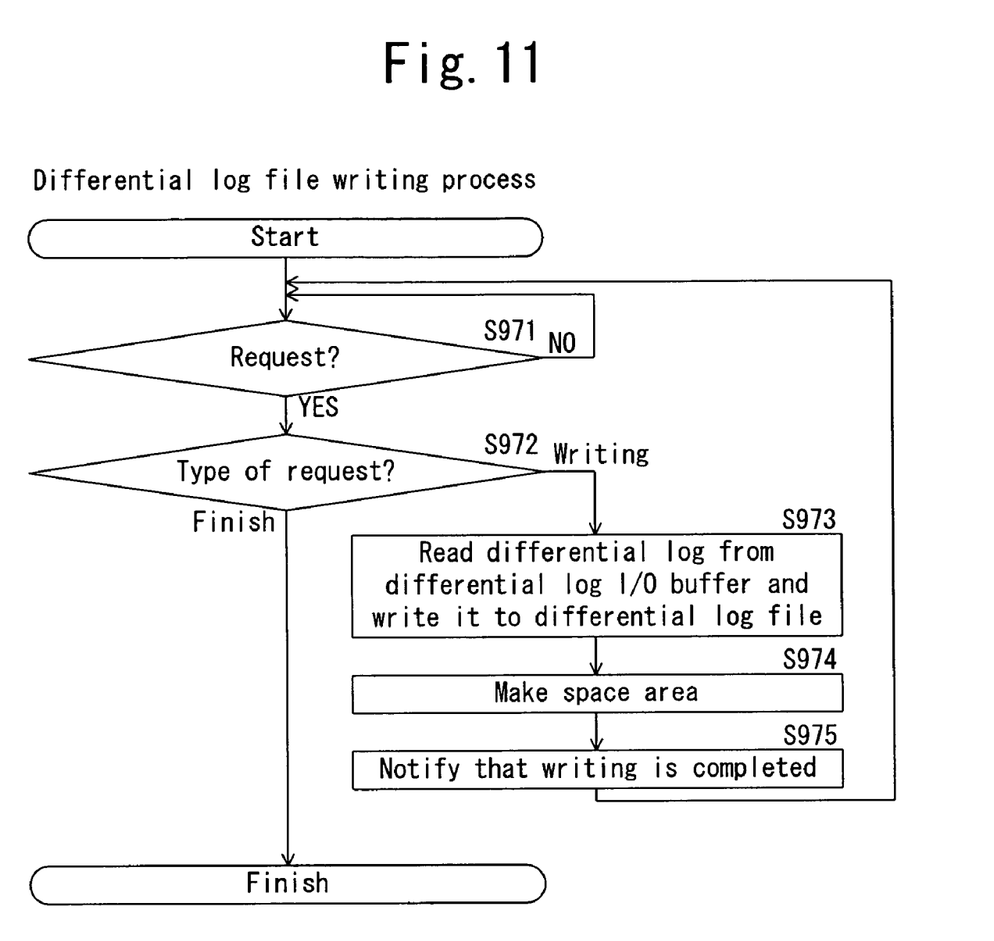
FIG. 11 is a flowchart showing the flow of a differential-log-file-writing process.

FIG. 11 is a flowchart showing a flow of the differential-log-file-writing process. Receiving a request of a process from any function (step S971; YES), the differential-log-file-writing process task 97 finishes the process when the request is "finish" (step S972; YES). On the other hand, when the request is "writing" (step S972; NO), the task 97 writes the differential log, which is read from the differential log I/O buffer 95, into the differential log file 96 (step S973), makes a space area in the differential log I/O buffer 95 (Step S974), and notifies that the writing is completed (step S975).

That is, when the original database device of the prior art includes the function for replication, the following two writings are guaranteed (committed). (1) Only differential logs about UPDATE, DELETE, and INSERT are written into the differential log file 96 before committing the saving of a transaction log by writing a recovery log to the recovery log file 93. (2) Only differential log about the commitment control is written into the differential log file 96 after committing the saving of a recovery log of transaction.

The commitment (COMMIT) method in the steps S903 through S905 is adopted in order to avoid committing the saving of a differential log before committing the saving of a recovery log when the database device aborts between the steps S903 and S904, and in order to recover a differential log of the commitment control from a recovery log saved in the recovery log file 93 even when the database device aborts between the steps S904 and S905.

This kind of art is disclosed in JP2003-015926A, for example.

However, the above-mentioned commitment (COMMIT) method includes waits for an I/O process in steps S903 and S905. Since a wait for an I/O process increases transaction processing time, the number of transaction processing per unit time decreases.

Therefore, the replication function by the method is hard to be adopted in a high traffic system that requires high transaction processing performance.

SUMMARY OF THE INVENTION

It is therefore an object of the present invention to provide a database system management method, which is capable of adding a replication function to a database device without increasing transaction processing time.

The database system management method of the present invention manages a database system that includes a first database device whose memory content in a storage area is changed based on a command designated through a network from any business terminal device, and a second database device for storing the same memory content as the first database device as a backup. The method makes the first database device execute: creating and storing a logical log that correlates a command content with a memory content that is changed by a process in the storage area every time the process is executed according to each command; creating a physical log that correlates a position information about the portion that is changed by the process in the storage area, the memory content after changing by the process, and a class of the process every time the process is executed according to each command; and storing command specifying information that specifies the command corresponding to the physical log with the corresponding physical log every time each physical log is created.

Since the command specifying information is correlated with the physical log when the physical log is stored as mentioned above, the logical log corresponding to the physical log can be designated. Therefore, memory contents in the storage area can be recovered by the physical log, and the logical log can be also recovered. Further, since a commitment of saving the physical log is not needed to synchronize with a commitment of saving the logical log, the physical log and the logical log can be saved asynchronously.

As a result, the wait for an I/O process as described above does not occur, and thus, the transaction processing time does not increase.

A database system of the present invention includes a first database device whose memory content in a storage area is changed based on a command designated through a network from any business terminal device, and a second database device for storing the same memory content as the first database device as a backup. The first database device includes: a logical-log-creation section for creating a logical log that correlates a command content with a memory content that is changed by a process in the storage area every time the process is executed according to each command; a logical-log-storage section for storing the logical log created by the logical-log-creation section; a physical-log-creation section for creating a physical log that correlates a position information about the portion that is changed by the process in the storage area, the memory content after changing by the process, and a class of the process every time the process is executed according to each command; and a physical-log-storage section for storing command specifying information that specifies the command corresponding to the physical log with the corresponding physical log every time each physical log is created.

Therefore, this database system has the same function as a database system that implements the above-mentioned database management method of the present invention.

Further, a database device of the present invention whose memory content in a storage area is changed based on a command designated through a network from any business terminal device includes: a logical-log-creation section for creating a logical log that correlates a command content with a memory content that is changed by a process in the storage area every time the process is executed according to each command; a logical-log-storage section for storing the logical log created by the logical-log-creation section; a physical-log-creation section for creating a physical log that correlates a position information about the portion that is changed by the process in the storage area, the memory content after changing by the process, and a class of the process every time the process is executed according to each command; and a physical-log-storage section for storing command specifying information that specifies the command corresponding to the physical log with the corresponding physical log every time each physical log is created. Therefore, this database device has the same function as a database device that constitutes the above-mentioned database system of the present invention.

A backup program of the present invention makes a computer function as means including: a data storage means for changing a memory content in a storage area of a first storage device based on a command designated through a network from any business terminal device; a logical-log-creation means for creating a logical log that correlates a command content with a memory content that is changed by a process in the storage area of the first storage device every time the process is executed according to each command; a logical-log-storage means for storing the logical log created by the logical-log-creation means into a second storage device; a physical-log-creation means for creating a physical log that correlates a position information about the portion that is changed by the process in the storage area of the first storage means, the memory content after changing by the process, and a class of the process every time the process is executed according to each command; and a physical-log-storage means for storing command specifying information that specifies the command corresponding to the physical log with the corresponding physical log into a third storage device every time each physical log is created.

Therefore, this backup program can operate a computer as a device that has the same function as the above-mentioned database device of the present invention.

As described above, according to the present invention, a replication function can be added to a database device without increasing transaction processing time.

DESCRIPTION OF THE PREFERRED EMBODIMENTS

Next, the best mode to embody the present invention will be described in detail with reference to the attached drawings.

First, the configuration of the database system according to the embodiment is described.

Figure 1:
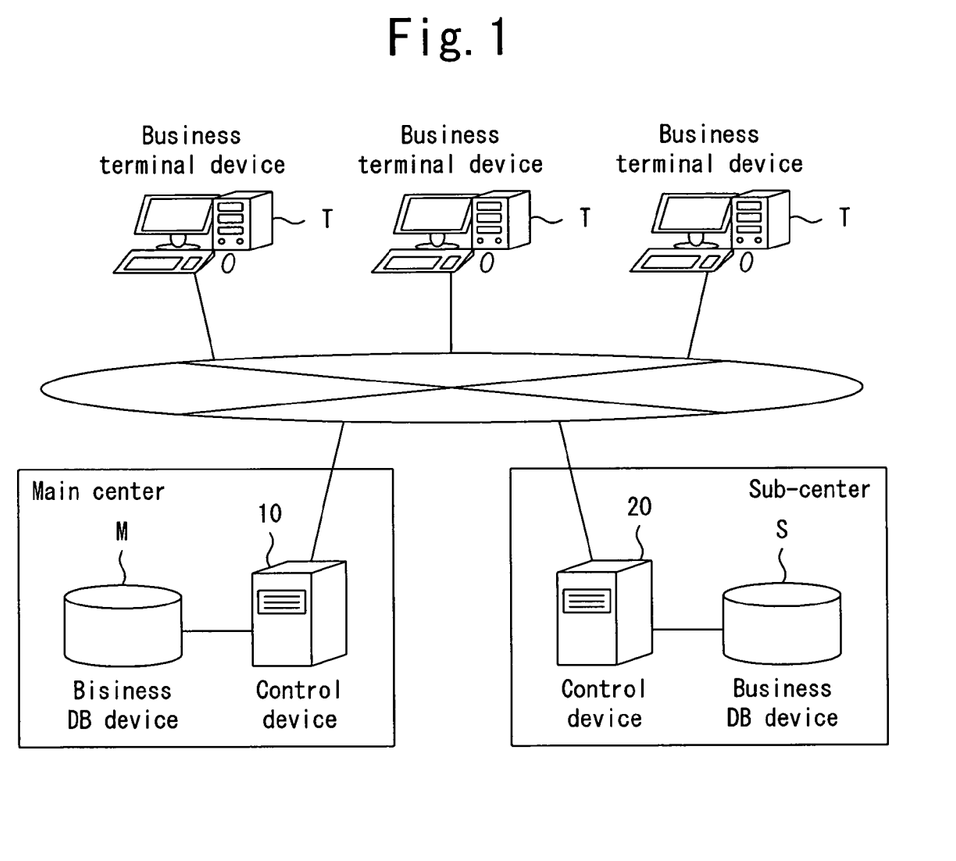
FIG. 1 shows a system configuration of a database system of an embodiment.

FIG. 1 shows the system configuration of the database system of the embodiment.

As shown in FIG. 1, the database system of the embodiment consists of a plurality of business terminal devices T, a control device 10 connected to a business database device M at a primary center, and a control device 20 connected to a business database device S in a auxiliary center. These devices T, 10, and 20 are connected through a network so that they can mutually communicate.

The business terminal device T has a function to send a request to execute transaction to the control devices 10 and 20 through the network. The business terminal device T consists of a general personal computer and well-known software that makes the personal computer function as the business terminal.

Each of the business database devices M and S has a function for storing the business data acquired from the process executed by the control devices 10 and 20 in response to the request from the business terminal device T. Each of the business database devices M and S consists of a general-purpose computer, a database table in which business data is stored, and well-known software that implements functions including an addition, a deletion, a change, and a retrieval of the business data in the database table.

The control devices 10 and 20 control input and output of the business data by the business database devices M and S. The control devices 10 and 20 have functions to operate the database devices M and S that are managed by themselves as management targets or replicas in response to the operating mode. When operating a business database device as a management target, the control devices 10 and 20 execute transaction in response to the request from the business terminal device T. Then, the control devices 10 and 20 update the business data in the business database device in response to the result of the transaction and/or notify the information about the process result to the business terminal device T. When operating a business database device as a replica for backup, on the other hand, the control devices 10 and 20 acquire the information about the update executed in the business database device as the management target in concert with the control device of the business database device of the management target, and execute the same update for the business data in the business database device thereof.

Under the normal condition, the database system of the embodiment operates the business database device M in the primary center as the management target and operates the business database device S in the auxiliary center as the replica for backup. Further, when the business database device M in the primary center is impossible to use due to a natural disaster, a power failure, or a system failure, the database system of the embodiment operates the business database device S in the auxiliary center as the management target. The auxiliary center may be located at a distant place from the primary center so as not to reach a natural disaster to both centers simultaneously.

Figure 2:
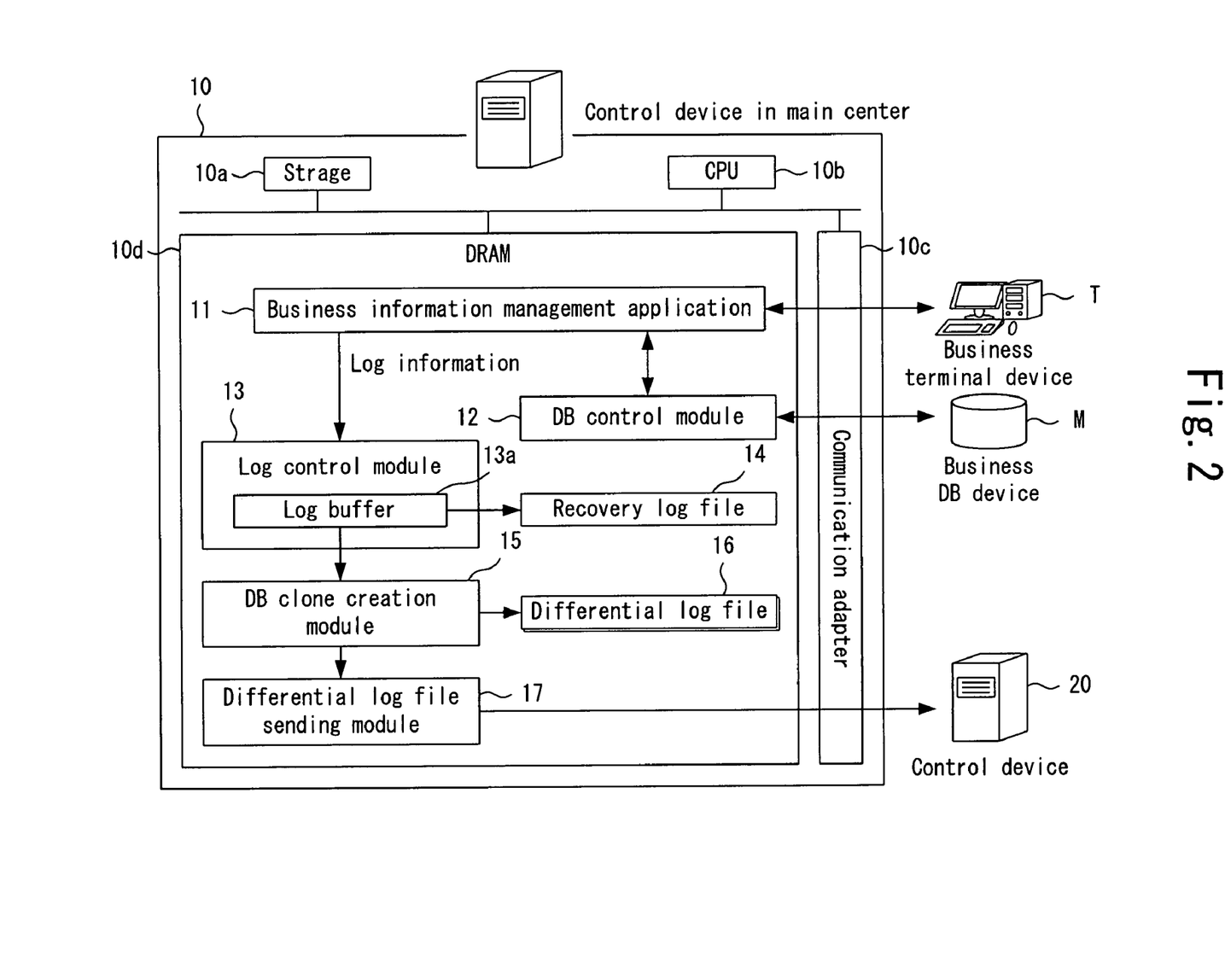
FIG. 2 is a block diagram of a control device in a primary center under a normal condition.

FIG. 2 is a block diagram of the control device 10 in the primary center under the normal condition.

As shown in FIG. 2, a general-purpose computer that constitutes the control device 10 contains well-known hardware, such as storage 10a, a CPU (Central Processing Unit) 10b, a communication adapter 10c, and a DRAM (Dynamic Random Access Memory) 10d. A business information management application 11 that exchanges the information with the business terminal device T; a well-known database control module program 12 that controls input and output of the business data to the business database device M; a log control module program 13 that creates log information used to recover the business data in the business database device M; a DB clone creation module program 15 that creates log information used to update the business database device S in the auxiliary center; and a differential log file sending module program 17 that delivers the log information to the control device 20 in the auxiliary center are installed in the storage 10a. These application and module programs are executed, when the CPU 10b reads them from the storage 10a and develops onto the DRAM 10d.

In the control device 10 on the side of the management target under the normal condition, when receiving a request from the business terminal device T, the business information management application 11 issues an instruction for the business database device M to add, delete, change or retrieve the business data based on the transaction in cooperation with the database control module program 12. The business information management application 11 creates the log information about the update to the business database device M, and passes it to the log control module 13. The log control module 13 allocates a log buffer as a workspace in which the log information received from the business information management application 11 is temporarily stored. And then, the module 13 saves the log information that is temporarily stored in the log buffer into the recovery log file 14 as a recovery log. The DB clone creation module creates the differential log that is information required to update the business database device S on the replica side based on the log information of the log buffer in the log control module 13, and the module 15 saves the differential log into the differential log file 16. The differential-log-file-sending module 17 receives the differential log file 16 from the DB clone creation module 15, and sends it to the control device 20 on the replica side. The business database device M under the normal condition corresponds to the above-mentioned data storage means.

Next, the processes to create the recovery log file 14 and the differential log file 16 will be described in more detail.

Figure 3:
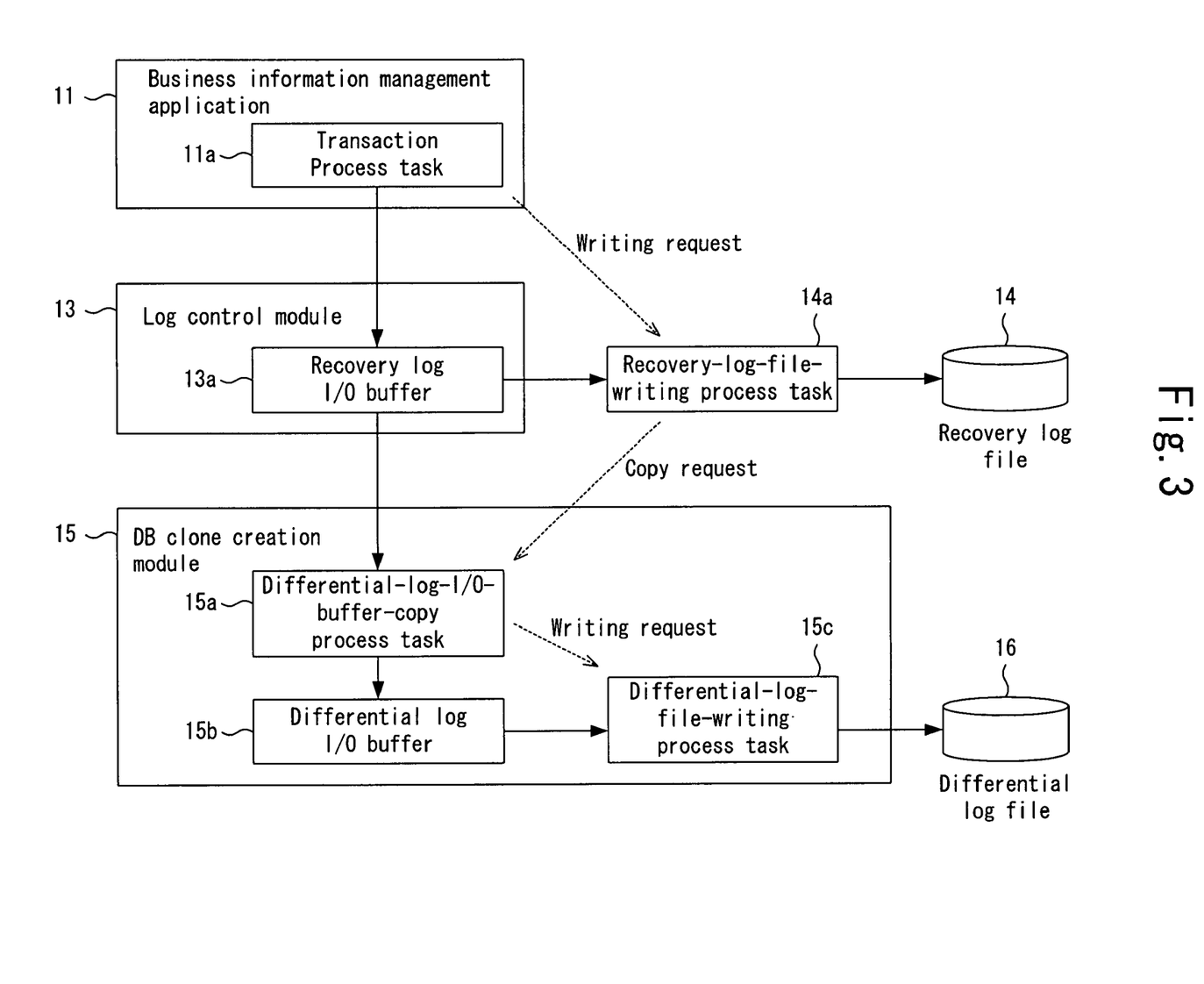
FIG. 3 is a functional configuration diagram to describe a process to create a recovery log file and a differential log file.

FIG. 3 is a functional configuration diagram to describe the process to create each of the log files 14 and 16.

As shown in FIG. 3, the business information management application 11 includes a transaction process task 11a. This transaction process task 11a has a function to create log information about the update applied to the business database device M. The log information created here contains a type of an SQL (Structured Query Language) statement that constitutes transaction; SQL command statement images of the commands such as UPDATE, DELETE, INSERT, COMMIT, and ROLLBACK; a transaction ID (Identification) that is identifying information to identify each transaction among all the transactions; memory contents (updated data) of the updated portion in the storage area of the business database device M after the update by executing the SQL command; and primary key information that specifies a record of the business data stored in the business database device S of a destination.

Whenever the transaction process task 11a creates such log information, it writes the log information to the recovery log I/O buffer 13a in the log control module 13 and requests a recovery-log-file-writing task 14a to write a recovery log, which is read from the recovery log I/O buffer 13a, into the recovery log file 14. In FIG. 3, the relationship between a source and a destination of a writing request is shown by the arrow of the dotted line.

Figure 4:
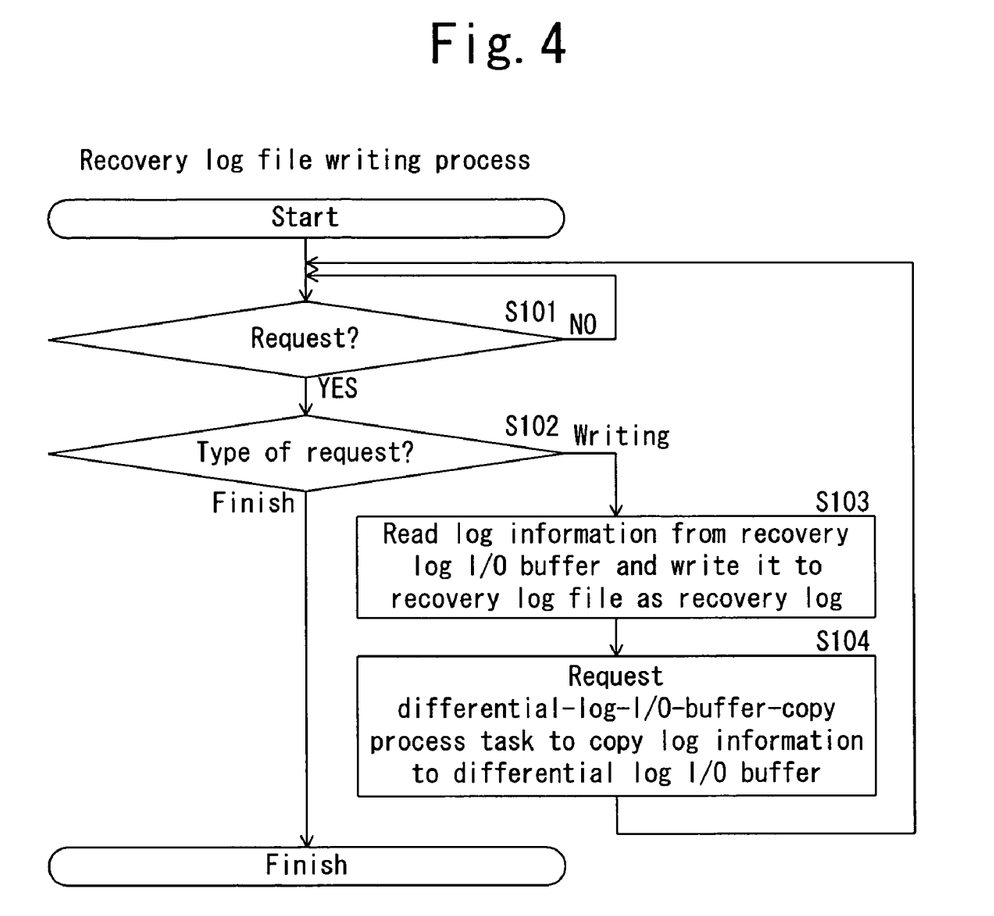
FIG. 4 is a flowchart showing the flow of a recovery log file writing process.

FIG. 4 is a flowchart showing the flow of the recovery-log-file-writing process. The recovery-log-file-writing process task 14a waits until a writing request or a finish request is received from the transaction process task 11a (step S101; NO). When the task 14a receives the finish request (step S101; YES, S102; finish), it finishes the process in FIG. 4. On the other hand, when the recovery-log-file-writing process task 14a receives the writing request (step S101; YES, S102; writing), the task 14a reads the log information from the recovery log I/O buffer 13a, and saves the log information to the recovery log file 14 as a recovery log (step S103).

Figure 5:
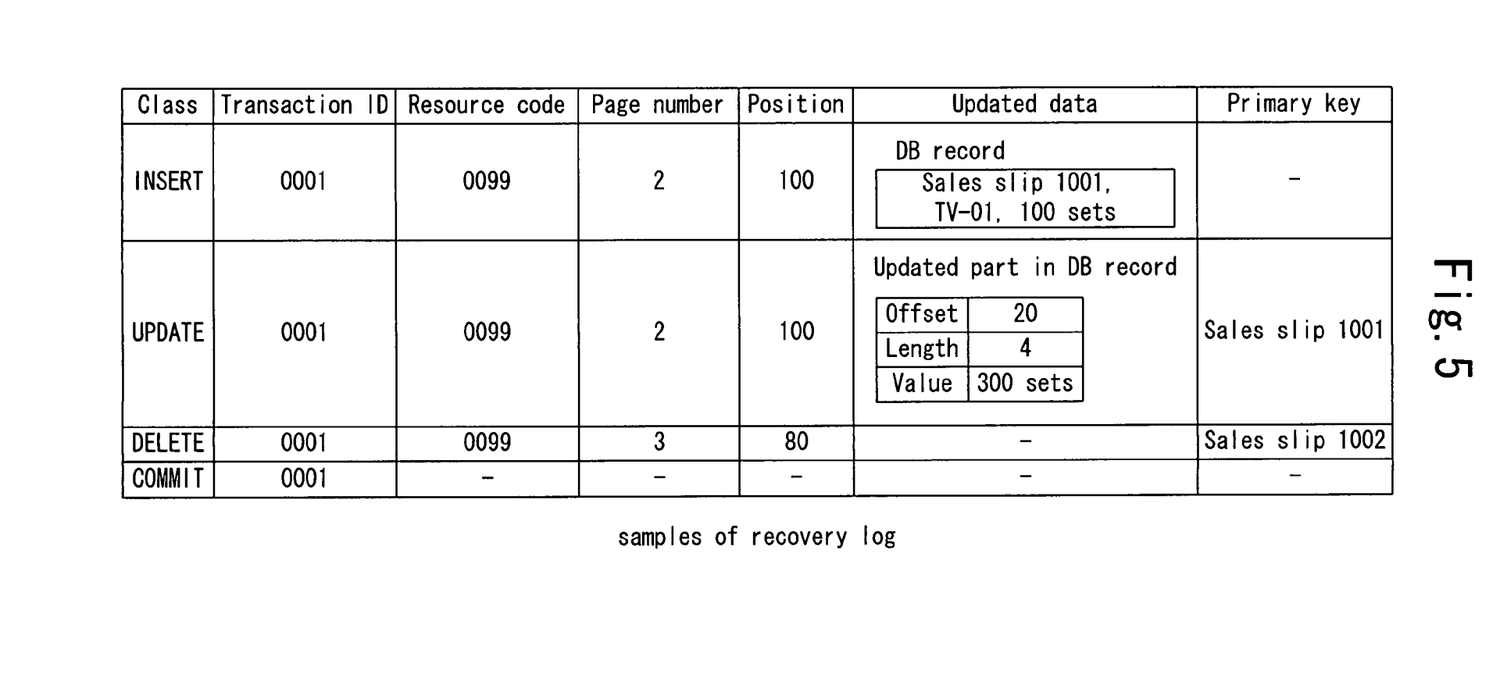
FIG. 5 is a table showing examples of recovery logs.

FIG. 5 is a table showing examples of recovery logs created here.

As shown in FIG. 5, the recovery log is information that correlates values in fields of a "class", a "transaction ID", a "resource code", a "page number", a "position", an "updated data", and a "primary key". A class (INSERT, UPDATE, DELETE, or COMMIT) of an SQL statement that constitutes a transaction is stored in the "class" field. A transaction ID is stored in the "transaction ID" field. Information about physical position is stored in the "resource code", "page number", and "position" fields. Specifically, the "resource code" field stores a resource code that is information to identify a logical disk in which the business data is stored among a plurality of logical disks in the business database device M. The "page number" field stores the page number that is identification information for identifying the page in which the business data is stored among a plurality of pages in the logical disk. The "position" field stores the position information that indicates the position at which the business data is saved in the page. When the value in the "class" field is "COMMIT" or "ROLLBACK", the recovery log is a control log that has no contents of the business data. Therefore, the "resource code", "page number", and "position" fields are blank in such a case. The "updated data" field stores the updated data at the saving position. The "primary key" field stores the primary key information. However, when the values in the "class" field are "INSERT" and "COMMIT", the "primary key" field serves as a blank.

The conventional business information management application 11 and the log control module 13 create the recovery log including the fields shown in FIG. 5 except the "primary key" field. On the other hand, the recovery log created in the embodiment includes the "primary key" field.

As shown in FIG. 4, the recovery-log-file-writing process task 14a writes a recovery log to the recovery log file 14 (step S103), and then, it request the differential-log-I/O-buffer-copy process task 15a in the DB clone creation module 15 to copy the log information from the recovery log I/O buffer 13a to the differential log I/O buffer 15b in the DB clone creation module 15 (step S104). After that, the task 14a waits until the next request is received (step S101; NO). In FIG. 3, the relationship between a source and a destination of a copy request is shown by the arrow of the dotted line.

Figure 6:
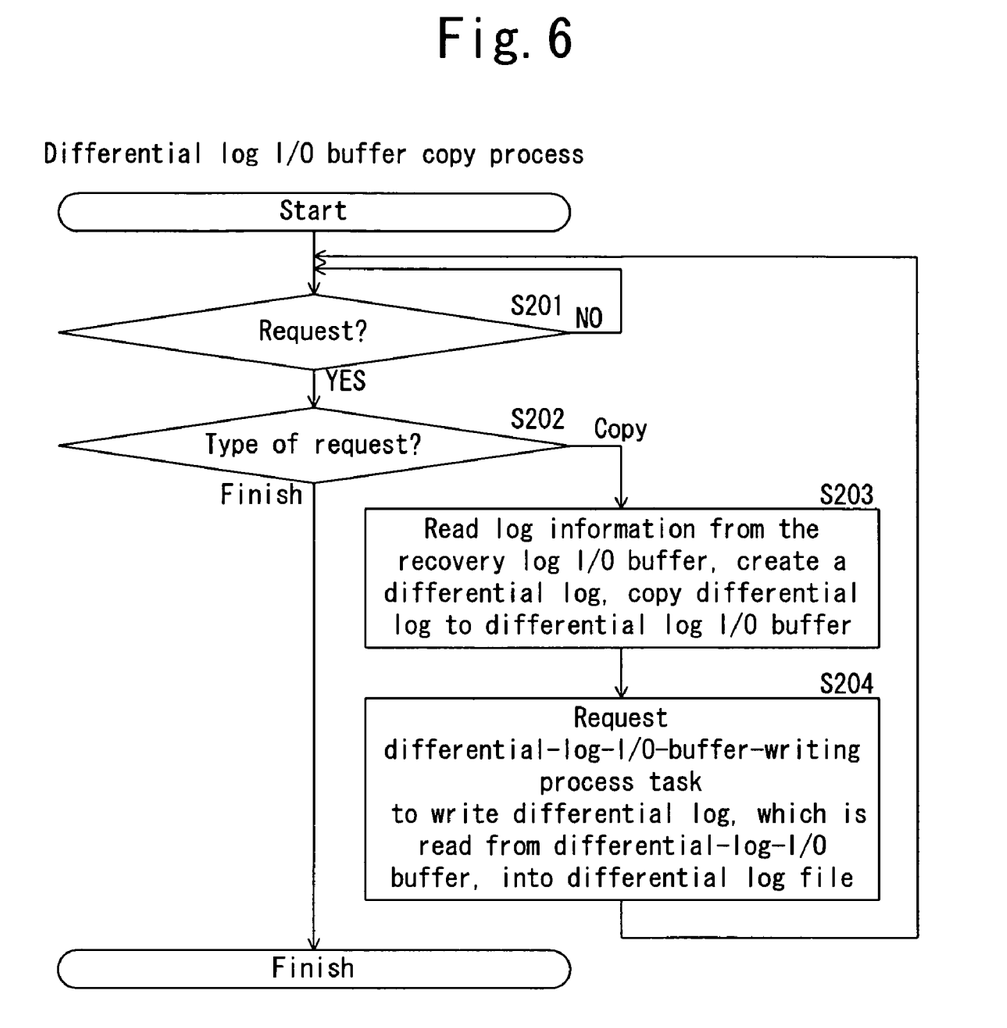
FIG. 6 is a flowchart showing the flow of a differential-log-I/O-buffer copy process.

FIG. 6 is a flowchart showing the flow of the differential-log-I/O-buffer-copy process. The differential-log-I/O-buffer-copy process task 15a in the DB clone creation module 15 waits a copy request or a finish request comes from the recovery-log-file-writing process task 14a (step S201; NO). When the finish request is received (step S201; YES, S202; finish), the process of FIG. 6 is finished. On the other hand, when a copy request is received (step S201; YES, S202; copy), the differential-log-I/O-buffer-copy process task 15a reads log information from the recovery log I/O buffer 13a, creates a differential log, and copies the differential log to the differential log I/O buffer 15b (step S203). The differential log created here includes a class of an SQL statement, an SQL command statement image, a transaction ID, updated data, and primary key information. However, the position related information (a resource code, a page number, and a position) may be removed in order to reduce the sending data amount. The differential-log-I/O-buffer-copy process task 15a copies the log information to the differential log I/O buffer 15b (step S203), and then, it requests the differential-log-file-writing process task 15c in the DB clone creation module 15 to write the differential log, which is read from the differential log I/O buffer 15b, into the differential log file 16 (step S204). After that, the task 15a waits until the next request is received (step S201; NO). In FIG. 3, the relationship between a source and a destination of a writing request is shown by the arrow of the dotted line.

Figure 7:
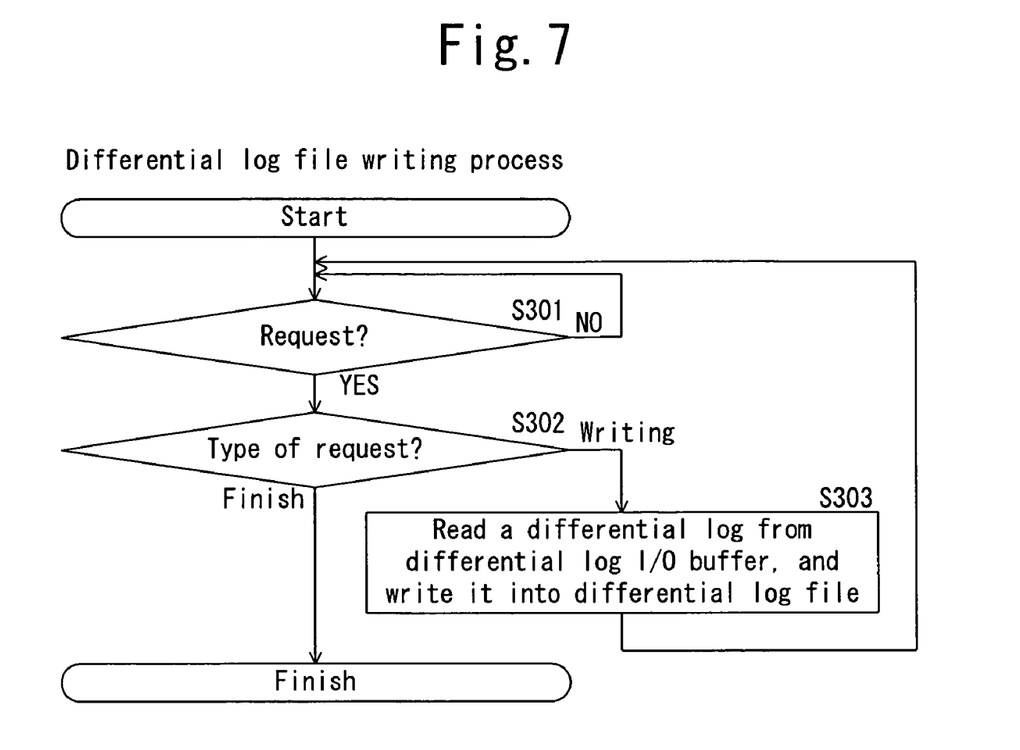
FIG. 7 is a flowchart showing the flow of a differential-log-file-writing process.

FIG. 7 is a flowchart showing the flow of the differential-log-file-writing process. The differential-log-file-writing process task 15c in the DB clone creation module 15 waits until a writing request or a finish request is received from the differential-log-I/O-buffer-copy process task 15a (step S301; NO). When a finish request is received (step S301; YES, S302; finish), the process of FIG. 7 is finished. On the other hand, when a writing request is received (step S301; YES, S302; writing), the differential-log-file-writing process task 15c reads a differential log from the differential log I/O buffer 15b, and saves the differential log into the differential log file 16 (step S303). Then, it waits until the next request is received (step S301; NO).

Therefore, the recovery-log-file-writing process task 14a corresponds to the physical log creation means and the recovery log file 14 corresponds to the physical log storage means that are mentioned above. Further, the differential-log-file-writing process task 15c corresponds to the logical log creation means, and the differential log file 16 corresponds to the logical log storage means that are mentioned above.

Next, the operations and effects of the database system of the embodiment will be described.

As mentioned above, the control device 10 of the embodiment incorporates the primary key information to the recovery log when saving the recovery log to the recovery log file 14. Thus, since the information corresponding to the conventional physical log is stored as the recovery log with linking to the primary key information, the differential log corresponding to the recovery log can be specified based on the primary key information. Therefore, when the control device 10 or the business database device M aborts, the memory contents (the business data) in the storage area of the business database device M can be recovered by the recovery log and the differential log can be also recovered. Further, since it becomes unnecessary to synchronize the guarantee (COMMIT) of the writing of a recovery log and the guarantee (COMMIT) of the writing of a differential log, a recovery log and a differential log can be written asynchronously (steps S104, S201, S204, S301). As a result, the wait for an I/O process in the prior art does not occur, and thus, the transaction processing time does not increase.

What is claimed is:

1. A database system management method comprising:
   updating data stored in a first database device based on a command designated through a network from a terminal device;
   creating a logical log that includes content of the command, updated data in the first database device and primary key information;
   storing the logical log into a first storing area of the control device;
   creating a physical log that includes a position information about the updated data in the first database device, the undated data in the first database device, a class of the command and the primary key information; and
   storing the physical log into a second storing area of the control device,
   wherein the primary key information is information specifying the logical lop corresponding to the physical log.

2. The database system management method according to claim 1, further comprising sending the logical log to another control device.

3. The database system management method according to claim 2, wherein said another control device updates data stored in a second database device based on the logical log received from the control device.

4. A database system comprising:
   an updating section to update data stored in a first database device based on a command designated through a network from a terminal device;
   a logical-log-creation section to create a logical log that includes content of the command, updated data in the first database device and primary key information;
   a logical-log-storage section to store the logical log created by the logical-log-creation section;
   a physical-log-creation section to create a physical log that includes a position information about the updated data in the first database device, the updated data in the first database device, a class of the command and the primary key information; and
   a physical-log-storage section to store the physical log created by the physical-log-creation section,
   wherein the primary key information is information specifying the logical log corresponding to the physical log.

5. A storage medium storing a backup program comprising:
   updating data stored in a first database device based on a command designated through a network from a terminal device;
   creating a logical log that includes content of the command, updated data in the first database device and primary key information;
   storing the logical log into a first storing area of the control device;
   creating a physical log that includes a position information about the updated data in the first database device, the updated data in the first database device, a class of command and the primary key information; and
   the physical log into a second storing area of the control device,
   wherein the primary key information is information specifying the logical log corresponding to the physical log.

* * * * *

UNITED STATES PATENT AND TRADEMARK OFFICE
CERTIFICATE OF CORRECTION

PATENT NO. : 7,698,319 B2 Page 1 of 1
APPLICATION NO. : 11/647049
DATED : April 13, 2010
INVENTOR(S) : Taniguchi et al.

It is certified that error appears in the above-identified patent and that said Letters Patent is hereby corrected as shown below:

Claim 5, Col. 10, Line 33    Insert --storing-- before "the physical log".

Signed and Sealed this

Seventeenth Day of August, 2010

David J. Kappos
*Director of the United States Patent and Trademark Office*